United States Patent [19]

Norby

[11] 4,076,878

[45] Feb. 28, 1978

[54] FLAME-RETARDANT FLOCKED FABRIC

[75] Inventor: Llaney C. Norby, Kennebunkport, Me.

[73] Assignee: West Point-Pepperell, Inc., West Point, Ga.

[21] Appl. No.: 726,438

[22] Filed: Sep. 27, 1976

Related U.S. Application Data

[63] Continuation-in-part of Ser. No. 611,684, Sept. 9, 1975, abandoned.

[51] Int. Cl.² ............................................. B32B 33/00
[52] U.S. Cl. ....................................... 428/90; 428/95; 428/97; 428/310; 428/315; 428/411; 428/425; 428/921
[58] Field of Search ...................... 428/89, 90, 95, 97, 428/310, 315, 411, 538, 539, 921, 85, 425

[56] References Cited

U.S. PATENT DOCUMENTS

| | | | |
|---|---|---|---|
| 3,528,874 | 9/1970 | Spencer | 428/90 |
| 3,663,345 | 5/1972 | Jaisinghani | 428/97 |
| 3,949,108 | 4/1976 | Donaldson | 428/921 |

Primary Examiner—Marion E. McCamish
Attorney, Agent, or Firm—Cushman, Darby & Cushman

[57] ABSTRACT

A flame-retardant material, and a method for making same, which comprises: (1) a reinforcing ply of textile material; (2) at least one sheet of foam bonded to a face of the reinforcing ply; (3) a layer of flock fibers adhered to the foam thereby covering the exposed face of the foam; and (4) a flame-retardant adhesive system disposed in two layers between said flock fibers and the foam sheeting.

15 Claims, 2 Drawing Figures

FLAME-RETARDANT FLOCKED FABRIC

This is a continuation-in-part of application Ser. No. 611,684, filed Sept. 9, 1975, now abandoned.

BACKGROUND OF THE INVENTION

Various governmental test standards have been developed for determining the acceptability of flame-retardant fabrics. A so-called "horizontal test" comprises clamping a treated textile material, held in the horizontal position, to a piece of lens paper and impinging a flame against the textile. According to this test, the textile is deemed satisfactory if the lens paper is not scorched.

A more stringent standard was adopted in the so-called "vertical test" (Department of Commerce DOC FF 3-71 Standard for Children's Sleepwear of 0 to 6X sizes). In this test, a piece of textile material is held in a vertical position while the bottom edge of the piece of material is exposed to a gas flame for three seconds. The flame retardant characteristics of the material are deemed acceptable (1) if either five samples of the textile burn for no more than a total of seven inches (average of five samples) or flame for no longer than ten seconds; (2) if no sample burns for 10 inches; and (3) if the treated textile meets the aforementioned requirements after fifty washes, or at the time at which the textile product is no longer useful.

A typical fabric which has met with substantial commercial success as a material for blankets and sleepwear is that disclosed in U.S. Pat. No. 3,528,874 granted on Sept. 15, 1970 to Francis T. Spencer. This patent sets forth a construction wherein a reinforcing ply of material is secured on one or both of its sides to a polyurethane foam layer(s) to the exposed surface(s) of which flock is adhered.

In an effort to reduce the flammability characteristic of fabric of the type disclosed in U.S. Pat. No. 3,528,874, it is known to include a flame-retardant in the adhesive which joins the flock to the foam substrate. However, when applicant and his assignee have experimentally mixed flame-retardant compositions with the flock adhesive in sufficient quantities to permit the fabric to pass the vertical flame test, the resultant product has proven unsatisfactory. More particularly, the adhesive has either not retained its capacity to bond the flock to the foam substrate, or the product has become too stiff to possess the drapeability and softness characteristics required for use as blankets and sleepwear. The latter problem cannot be easily remedied by inclusion of plasticizer into the flame-retardant flock adhesive system since plasticizers may promote fabric yellowing, foam decomposition, adhesive incompatibility or migrational problems.

SUMMARY OF THE INVENTION

The invention is directed to a flame-retardant flocked lamellar foam material, and to the method for producing same, which is acceptable for use as blankets and children's sleepwear and which meets the requirements of the "vertical test" set forth above.

The lamellar product comprises (a) a textile support; (b) at least one sheet of foam bonded to the support; (c) an adhesive system, which contains the active flame-retardant ingredients disposed in two layers on the exposed face(s) of the foam; and (d) flock applied to the exposed surface(s) of the second adhesive layer.

The method by which the material is made in accordance with a preferred embodiment of the invention comprises coating a laminate, formed of at least one layer of polyurethane foam bonded to a textile support, with an adhesive composition containing a brominated flame-retardant compound and antimony trioxide; curing the adhesive composition; disposing over the cured adhesive layer a flock adhesive containing aluminum hydroxide; applying flock to the aluminum hydroxide-containing adhesive; and curing the assembly once again.

The invention will become more fully apparent when considered in the light of the following detailed description of an illustrative preferred embodiment of the invention and from the appended claims.

The illustrative embodiment may be best understood by reference to the accompanying drawings, wherein:

FIG. 1 is a fragmentary view in section of a typical flame-retardant fabric; and FIG. 2 is a flow sheet indicating the steps involved in fabricating a flame-retardant fabric of the type shown in FIG. 1.

DETAILED DESCRIPTION OF THE INVENTION

Figure 1:
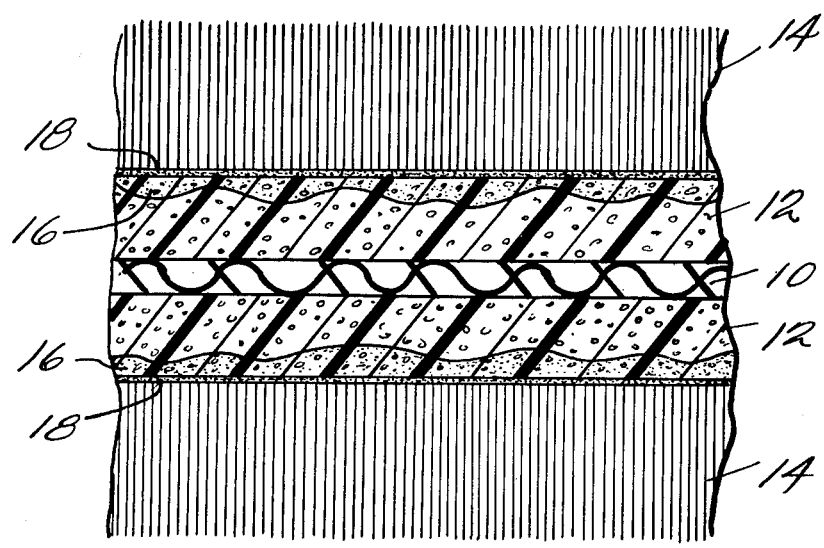

The invention is directed to a lamellar fabric of the type disclosed in U.S. Pat. No. 3,528,874-Spencer which is flame-retardant. Such a material is suitable for use as a blanket or in sleepwear. The construction illustrated in FIG. 1 comprises a reinforcing textile ply 10 to which is bonded on at least one side thereof a closed cell polyurethane sheet 12. At least the major portion of the exposed face of each sheet of foam is covered by a layer of flock fibers 14. Such fibers could be of nylon, polyester or similar materials. A two layer flame-retardant adhesive system is disposed between the flock fibers and the polyurethane foam, the layers being indicated by numerals 16 and 18. Among the functions of the system is to secure the flock to the substrate formed by textile 10 and polyurethane sheet(s) 12.

The flame-retardants used in accordance with the invention comprise (1) a brominated compound in admixture with antimony trioxide and (2) aluminum hydroxide. In accordance with the invention, the brominated compound and the antimony trioxide are admixed with an adhesive (to be described hereinafter) and applied to the polyurethane foam substrate. The adhesive containing those two components is cured. Then, a flock adhesive (also to be detailed hereinafter), admixed with aluminum hydroxide, is applied to the coated polyurethane. Preferably, the flock adhesive is deposited on the polyurethane substrate without substantial spreading or penetration into the foam sheet.

The bromine-containing compound, which is admixed with antimony trioxide, is preferably a brominated aromatic compound. Brominated aromatic compounds which are useful in accordance with the invention are disclosed in U.S. Pat. No. 3,668,155, which was granted on June 6, 1972 to Charles Raley, Jr. Preferably a fully brominated diphenyl oxide or fully brominated biphenyl compound is employed as the brominated compound. A commercially available mixture of a bromine-containing compound and antimony trioxide is P/44 sold by White Chemical Corporation.

The adhesive vehicle for the combination of brominated compound and antimony trioxide should be water-insoluble when cured and capable of withstanding repeated and severe laundering. It must not be affected adversely by exposure either to heat or cold. It must not be so stiff, when cured, that it renders the fabric boardy. It must be capable of entrapping a suspended dyestuff employed to impart color to the fabric. Additionally, it must not appreciably discolor either of itself or through some chemical action, such as may be produced by exposure to high temperature or ultraviolet light.

An ideal adhesive should be free of acid salt-complexes or metallic salt-complex catalysts. Desirably it should have a viscosity of the order of 15±5 m.c.p.s. and be basic in nature, having a pH value of from 6.0 to 8.0. It should include some thermosetting characteristics to provide bonding strength. Preferably, it should produce, when cured, a white translucent film, and include an ultraviolet barrier thereby to protect the foam ply from the action of ultraviolet light. Any inorganic pigment, such as titanium dioxide, may serve this purpose.

As a basic adhesive, one was selected from the acrylic latex family group. This is Hycar 2600X137, a terpolymer of acrylate esters having a glass transition temperature of −18° C., sold by B. F. Goodrich Co. as an acrylic latex binder. This is a preferred binder since it is capable of being loaded to a tremendous degree. For instance, in accordance with the invention, the ratio of acrylic latex binder to total amount of fillers is 1:7. In addition to pigments which may act as ultraviolet barriers, a thickener may be employed to control viscosity, and anti-foaming agents may optionally be included, since the Hycar 2600X137 foams a bit.

Halogenated alkyl phosphate esters also may be included in the adhesive composition containing the brominated compound and antimony trioxide. Halogenated alkyl phosphate esters are used as plasticizers but also have flame-retardant characteristics. By way of example, tris-2,3-dibromopropyl phosphate (referred to as Tenneco T 23P Flame Retardant-sold by Tenneco Chemicals, Inc.), tris(beta-chloroethyl) phosphate (sold as Fyrol CEF by Stauffer Chemical Company) and mixtures of tris-2,3-dibromopropyl phosphate and tris(-beta-chloroethyl) phosphate (sold by J. F. Donovan, Inc. of Providence, R.I. under the trade name designation Donmix F-23) may be used as the plasticizer.

The adhesive which includes aluminum hydroxide, and which is used as the adhesive for bonding flock to the coated polyurethane substrate, should be free of acid salt-complex or metallic salt-complex catalysts in order to avoid yellowing of the substrate produced by breakdown of these complexes due to exposure to elevated temperatures and to ultraviolet radiation. The adhesive should have a viscosity of the order of 15±5 m.c.p.s. and a basic pH value of from about 7.5 to 8.5. It may include some thermosetting resin material to provide bonding strength. Preferably, it should produce, when cured, a colorless transparent film, and should include an ultraviolet absorber to protect the foam ply from the action of ultraviolet light. Preferably, the adhesive should also include an anti-foaming agent. Optionally, colored pigments and printing pigments (which may be organic and inorganic, but which normally are inorganic pigments), may be included in the latex binder as coloring agents. In a preferred embodiment the particular adhesive employed is an emulsion TR-934 sold by Rohm & Haas which is an acrylic latex containing 45% solids. In addition, thickeners may be included in the acrylic latex in amounts of 1 to 5 parts by weight, based on the solids content of the acrylic latex. A polyacrylate or celulosic thickener is used to obtain an adhesive composition, containing the aluminum hydroxide, which has a viscosity in the order of 15±5 m.c.p.s. One suitable thickener is Viscon 103, produced by Pioneer Chemical Works, Inc. of Maple Shade, N.J., which is an acidic cross-linking acrylic emulsion copolymer. The pH of the resulting adhesive composition should be 7.5 to 8.5 with adjustments being made if necessary, by a 26° baume concentrated ammonium hydroxide.

While particular acrylic latices have been described above, it is to be understood that the invention is not necessarily limited to the use of these particular acrylic emulsions. It is contemplated that other members of the acrylic latex family group, having physical characteristics similar to the aforementioned commercial latex compositions may be used as the basic adhesives which, by modification, will provide the physical characteristics desirable in an adhesive employed in the practice of the present invention.

In utilizing the two layer flame-retardant system, the adhesive containing the brominated compound and antimony trioxide is applied to the substrate such that the dry weight of the cured composition is 3 to 5 ounces per square yard, preferably 4 ounces per square yard, while ideal dry weight measurements are 4 to 4.5 ounces per square yard. As to the amount of the flock adhesive used, it has been found that the amount of adhesive per square yard may vary from 0.9 to 1.5 ounces and the thickness of the adhesive coating from 0.015 to 0.025 inch in the set state. There is a direct relationship between the amount of flock fiber which may be attached and the amount of adhesive employed. However, since it is contemplated that a rather broad range of flock lengths and quality may be used, the amount of adhesive and the thickness of the coating may well be extended under certain conditions depending on the type of fiber employed.

Since the layer of adhesive 18 for anchoring the flock fibers is of but small depth, this layer does not have any appreciable and undesirable effect in stiffening the material even though the foam is of the closed-cell type. Nevertheless, there is an advantage in applying the adhesive 18 so as to form a discontinuous skin or layer, the discontinuity appreciably adding to the softness and drapeability of the completed material as is indicated in U.S. Pat. No. 3,528,874-Spencer.

Figure 2:
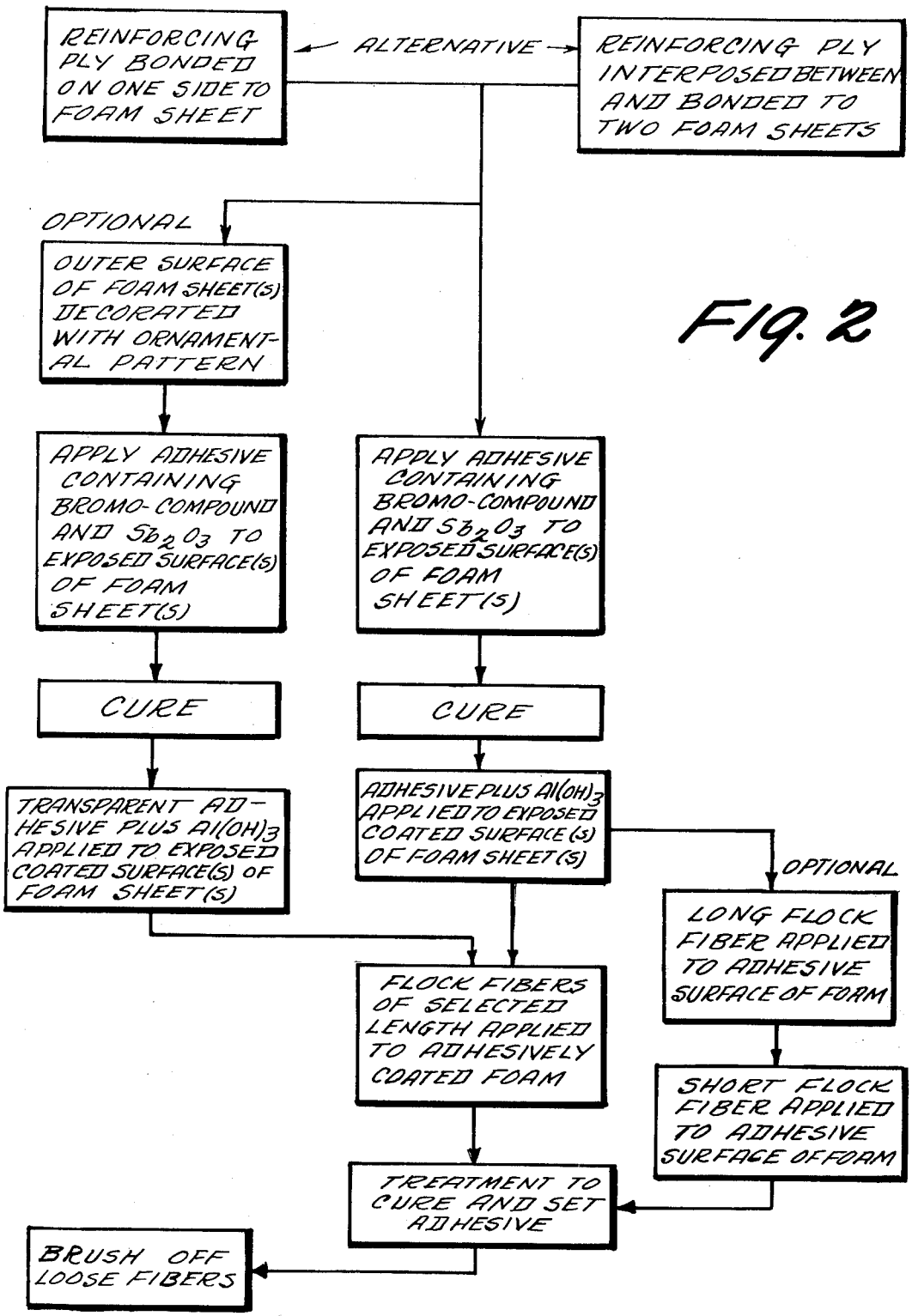

Now that the components used in the flame-retardant fabric have been described, the process for making same will be set forth in greater detail. In this regard, reference is directed to the flow sheet constituting FIG. 2 of the drawings.

First a laminate comprising either (1) a reinforcing ply of textile material bonded on one side to a foam sheet or (2) a reinforced textile ply interposed between and bonded to two foam sheets is provided. The exposed surface(s) of the foam is coated with an adhesive containing (1) the brominated compound and antimony oxide. Thereafter, this coating is cured. Subsequently, a transparent adhesive, containing aluminum trihydroxide, is applied to the exposed coated foam surface(s). Flock fibers of selected length are applied to the adhesively coated foam, and the composite is cured to set the adhesive. Excess loose fibers are brushed from the cured composite.

The process will be further described by the Example set forth below which refers to the embodiment illustrated in FIG. 1. However, it should be appreciated that this example is not to be taken as limiting but rather should be construed to include alternative methods for achieving the flame-retardant properties which characterize the invention.

EXAMPLE

A laminate is provided comprising a reinforcing ply of textile material 10 interposed between and bonded to two closed-cell polyurethane foam sheets 12.

The composition for adhesive layer 16 is prepared according to the following formulation:

| COMPOUND | | PARTS BY WEIGHT |
|---|---|---|
| P/44 | (an aqueous suspension of a brominated diphenyl compound and antimony trioxide - sold by White Chemical Corporaton) | 48.0 |
| F-23 | (a mixture of tris-2, 3-dibromopropyl phosphate and tris(beta-chloroethyl) phosphate - sold by J. F. Donovon, Inc. of Providence Rhode Island | 44.0 |
| Water | | 8.0 |
| Isopropanol | | 5.0 |
| Hycar 2600X137 | (an acrylic latex binder sold by B. F. Goodrich) | 17.0 |
| Antifoamer | | 0.1 |
| Titanium dioxide | | 14.0 |

In addition to 70 parts by weight of brominated compound and 12 parts Sb$_2$O$_3$, it is believed that P/44 contains 50 parts water and 5 parts 4% ethoxy cellulose solution in water.

The composition is formulated by mixing the emulsion Hycar 2600X137 with the anti-foaming agent, the titanium dioxide and about one-half of the water. Separately, the F-23 and isopropanol are admixed until the mixture is clear. Then the clear mixture of F-23 and isopropanol is added to the emulsion'137 mix. The resultant mixture is stirred until all bubbles are removed and all ingredients dispersed. Then, the P/44 is added to the mixture followed by the remaining water.

In practice, the proportions of the components of the aforementioned formulation may be varied as follows, based on parts by weight: P/44 - 45 to 50; F-23 - 40 to 46; Hycar 2600X137 -15 to 19 and titanium dioxide - 11 to 17. The amount of anti-foaming agent is not critical nor essential, but is used to obviate slight foaming due to the Hycar 2600X137. Water and isopropanol are used in amounts adequate to insure proper consistency of the resulting composition.

The adhesive composition described above may be applied to the exposed foam surfaces of the laminate by means of a roller having a ribbed surface as disclosed, for example, in U.S. Pat. No. 3,528,874-Spencer. Of course, other types of roller arrangements also may be used.

After coating the substrate with the aforementioned adhesive composition, the material is cured so as to set the adhesive. This may be accomplished by passing the material through an oven heated to the proper temperature. The temperature required obviously depends upon the curing characteristics of the adhesive employed and may range from 125° C. to 175° C.

After curing the first adhesive coating 16, which impregnates the polyurethane foam to a substantial degree, the second adhesive layer 18 is applied by suitable roller arrangements. The composition of an example of the second layer is set forth below and proportions thereof are recited:

| COMPONENTS | | PARTS BY WEIGHT |
|---|---|---|
| TR-934 | (an acrylic latex emulsion - sold by Rohm & Haas | 73.0 |
| Antifoamer | | 0.4 |
| Titanium dioxide | | 8.2 |
| Viscon 103 | (an acidic crosslinking acrylic emulsion copolymer sold by Pioneer Chemical Works, Inc.) | 2.0 |
| Color | | — |
| Water | | 8.2 |
| Aluminum hydroxide | | 8.2 |

All of the components are admixed with adequate stirring. Although not critical, it is preferred that the thickener Viscon 103 is the last item added to the admixture of the aforementioned components, while the coloring agent is the next to the last agent added.

The proportions of components of this second formulation may vary in parts by weight as follows: TR-934 - 70 to 75; anti-foaming agent - 0.2 to 0.6; titanium dioxide - 6 to 10; Viscon 103 - 1 to 5; color pigment (which is an optional component) - 0 to 3; water - 6 to 10; and aluminum hydroxide - 6 to 10. The resulting composition should have a viscosity of 15±5 m.c.p.s.

Prior to curing, nylon flock fibers are applied to the surface of the second coating 18. Apparatus suitable for application of flock to a base fabric is well known and commercially obtainable. An example is described in U.S. Pat. No. 3,528,874-Spencer. The adhesive composition containing aluminum hydroxide then is cured by heating the composite laminate in an oven at elevated temperatures. Obviously the temperatures of the oven depend on the adhesive composition. Generally the curing temperatures range between 125° C. and 175° C.

Several optional steps may be included in the process. For example, the flock itself may be treated with a suitable flame-retardant reagent. Additionally artistic and ornamental effects may be obtained by various techniques. For instance prior to applying flock to the second adhesive coating, the foam layer may be passed through a printing apparatus whereby any desired pattern may be imprinted on the surface of the foam. Also by applying the second adhesive in an ornamental pattern on the surface of the coated polyurethane foam, flock will adhere to the areas constituting the pattern. Colored adhesives can be used to create further effects thereby varying the ornamental appearance of the product.

By employing the foregoing techniques a flame-retardant fabric is produced which easily passes the stringent "vertical test" described above. The product typically has a burn length of ½ inch and a rate of extinction of one second or less. In addition, the fabric has a high heat-insulating property, is soft, and has good feel and drapeability.

While the preceding description is of a preferred illustrative embodiment of the invention, it will be appreciated that a number of variations are possible. For example, the substrate described includes a closed cell polyurethane foam. However, instead of this material, other compositions containing cells distributed through its mass, as in foamed natural or synthetic rubbers or foamed cellular plastics, could be used with the cells being open, interconnected or closed so as to be isolated from each other. Examples of plastic foams which could be employed include latex, phenol formaldehyde, epoxy, polystyrene, polyvinyl chloride, polyethylene and polypropylene.

Also, other flame-retardant materials could be employed. For example, instead of brominated diphenyl compounds, other sources of halogen from a group consisting of halogenated trialkyl phosphates, chlorinated paraffins, polyvinylbromides, polyvinylchlorides, halogenated aryl phosphates, phosphonium bromides, halogenated organophosphorus monomers, and mixtures thereof, could be used. As substitutes for antimony trioxide or aluminum hydroxide, it is possible to employ such metal compounds as metal oxides, borates and phosphates, and mixtures thereof, by selecting from a group consisting of zinc oxide, antimony pentoxide, aluminum borate, aluminum oxide, boron oxide, boron phosphate, zinc borate, and zinc phosphate. Other phosphate plasticizers which may be used may be selected from the group consisting of halogenated trialkyl phosphates, aryl phosphates, alkyl acid phosphates, ammonium phosphates, triphenyl phosphates, phosphorus diols, organophosphorus monomers, reactive organophsophorus compounds, and mixtures thereof.

In formulating the two flame-retardant layers, various relationships of the materials used are observed. The first layer contains flame-retardant components between 71 and 99% by weight of such components as are disposed in both layers, whereas the flame-retardant components in the second layer contain between 1 and 29% by weight. The total weight of the flame-retardent components in both layers is between 21 and 49% of the total combined formulation weight of these layers, while such components in the second layer comprise approximately 1 to 30% of the weight of the adhesive vehicle used in the second layer formulation. Again, with respect to the total formulation weight of both layers, the use as flame-retardant components of halogen sources is between 3 and 22% by weight, metal compounds 1 to 15% by weight, and a phosphorus sources 0.4 to 7.0%. The various flame-retardant components may be distributed between the separate layers within the relationships just stated.

What is claimed is:

1. A flame-retardant flocked fabric comprising:
  (a) a reinforcing support of textile material;
  (b) a sheet of closed cell polyurethane foamed material bonded to at least one surface of said textile material;
  (c) a flame-retardant adhesive system disposed over an exposed surface of said sheet in two separate layers,
  one of said layers comprising in a cured adhesive vehicle a flame-retardant component combination of a brominated aromatic compound and antimony trioxide, said one layer impregnating the exposed surface of said sheet, and
  the other of said layers comprising in a cured adhesive vehicle, aluminum hydroxide as a flame-retardant component, said other layer covering said one layer,
  said flame-retardant component combination being present in said one layer in an amount between 71–99 percent by weight of the total weight of flame-retardant components in both said layers, the total flame-retardant components in both said layers being between 21–49 percent by weight of the total weight of both said layers, the flame-retardant component in said other layer being about 1–30 percent by weight of the weight of the adhesive vehicle (wet basis) present in said other layer, the brominated aromatic compound in said one layer being present in an amount between 3 and 22 percent by weight based on the total weight of both said layers and the antimony trioxide and the aluminum hydroxide together being present in an amount between 1 and 15 percent by weight based on the total weight of said layers, and
  (d) flock fibers bonded to said other layer.

2. The flame-retardant flocked fabric of claim 1 wherein a sheet of foamed material is bonded to opposite surfaces of said textile material, said flame-retardant adhesive system being disposed over the exposed surface of said said sheet of foamed material.

3. The flame-retardant flocked fabric of claim 1 wherein said adhesive vehicle is a cured acrylic latex.

4. The flame-retardant flocked fabric of claim 1 wherein said brominated aromatic compound is selected from fully brominated diphenyl oxide, fully brominated biphenyl or a mixture thereof.

5. A flame-retardant flocked fabric comprising:
  (a) a reinforcing support of textile material;
  (b) a sheet of foamed material bonded to at least one surface of said textile material;
  (c) a flame-retardant adhesive system disposed over an exposed surface of said sheet in two separate layers,
  one of said layers comprising in a cured adhesive vehicle an effective flame-retardant amount of a combination of a halogen containing flame-retardant component and a metal-containing flame-retardant component selected from a metal oxide, a metal borate or a metal phosphate, said one layer impregnating the exposed surface of said sheet, and
  the other of said layers comprising in a cured adhesive vehicle an effective flame-retardant amount of a metal-containing flame-retardant component selected from a metal oxide, a metal borate or a metal phosphate, said other layer covering said one layer; and
  (d) flock fibers bonded to said other layer.

6. The flame-retardant flocked fabric of claim 5 wherein a sheet of foamed material is bonded to opposite surfaces of said textile material, said flame-retardant adhesive system being disposed over the exposed surface of each said sheet of foamed material.

7. The flame-retardant flocked fabric of claim 5 wherein said adhesive vehicle is a cured acrylic latex.

8. The flame-retardant flocked fabric of claim 5 wherein said halogen containing flame-retardant component in said one layer is selected from fully brominated diphenyl oxide, fully brominated biphenyl, a halogenated trialkyl, a chlorinated paraffin, a polyvinyl bromide, a polyvinyl chloride, a halogenated aryl phosphate, a phosphonium bromide, a halogenated organo phosphorus monomer and a mixture thereof.

9. The flame-retardant flocked fabric of claim 5 wherein said metal containing flame-retardant component in said one layer is selected from antimony trioxide, zinc oxide, antimony pentoxide, aluminum borate, aluminum oxide, boron oxide, boron phosphate, zinc borate or zinc phosphate.

10. The flame-retardant flocked fabric of claim 5 wherein said metal containing flame-retardant component in said other layer is selected from aluminum hydroxide, zinc oxide, antimony pentoxide, aluminum borate, aluminum oxide, boron oxide, boron phosphate, zinc borate or zinc phosphate.

11. The flame-retardant flocked fabric of claim 5 wherein said foamed material is selected from an open cell, an interconnected cell or closed cell foamed material.

12. A flame-retardant flocked fabric comprising:
    (a) a reinforcing support of textile material;
    (b) a sheet of foamed material bonded to at least one surface of said textile material;
    (c) a flame-retardant adhesive system disposed over an exposed surface of said sheet in two separate layers,
    one of said layers comprising in a cured adhesive vehicle an effective flame-retardant amount of a combination of a brominated aromatic compound and antimony trioxide, said one layer impregnating the exposed surface of said sheet, and
    the other of said layers comprising in a cured adhesive vehicle an effective flame-retardant amount of aluminum hydroxide, said other layer covering said one layer; and
    (d) flock fibers bonded to said other layer.

13. The flame-retardant flocked fabric of claim 12 wherein a sheet of foamed material is bonded to opposite surfaces of said textile material, said flame-retardant adhesive system being disposed over the exposed surface of each said sheet of foamed material.

14. The flame-retardant flocked fabric of claim 12 wherein said adhesive vehicle is a cured acrylic latex.

15. The flame-retardant flocked fabric of claim 12 wherein said brominated aromatic compound is selected from fully brominated diphenyl oxide, fully brominated biphenyl or a mixture thereof.

* * * * *